United States Patent
Wang et al.

(10) Patent No.: US 6,936,237 B2
(45) Date of Patent: Aug. 30, 2005

(54) REFORMING CATALYSTS AND METHODS OF ALCOHOL STEAM REFORMING

(75) Inventors: Yong Wang, Richland, WA (US); Anna Lee Y. Tonkovich, Marysville, OH (US); Jianli Hu, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 644 days.

(21) Appl. No.: 09/788,294

(22) Filed: Feb. 16, 2001

(65) Prior Publication Data

US 2001/0026782 A1 Oct. 4, 2001

Related U.S. Application Data

(63) Continuation-in-part of application No. 09/640,903, filed on Aug. 16, 2000, now Pat. No. 6,680,044, and a continuation-in-part of application No. 09/375,614, filed on Aug. 17, 1999, now Pat. No. 6,488,838.

(51) Int. Cl.[7] .............................................. C01B 3/26
(52) U.S. Cl. ...................................... 423/652; 252/373
(58) Field of Search ....................... 252/373; 423/648.1, 423/652

(56) References Cited

U.S. PATENT DOCUMENTS

| | | | |
|---|---|---|---|
| 4,511,673 A | 4/1985 | Eto | 502/525 |
| 4,743,576 A * | 5/1988 | Schneider et al. | 502/242 |
| 5,075,277 A | 12/1991 | Saiai et al. | 502/333 |
| 5,510,056 A | 4/1996 | Jacobs et al. | 252/373 |
| 5,639,401 A | 6/1997 | Jacobs et al. | 252/373 |
| 6,040,266 A | 3/2000 | Fay, III et al. | 502/439 |
| 6,254,807 B1 | 7/2001 | Schmidt et al. | 252/373 |
| 6,413,449 B1 | 7/2002 | Wieland | 252/373 |
| 6,436,363 B1 | 8/2002 | Hwang et al. | 423/651 |
| 6,440,895 B1 | 8/2002 | Tonkovich et al. | 502/439 |
| 6,479,428 B1 | 11/2002 | Tonkovich et al. | 502/302 |
| 6,488,838 B1 | 12/2002 | Tonkovich et al. | 208/108 |
| 6,616,909 B1 | 9/2003 | Tonkovich et al. | 423/648.1 |
| 2001/0016188 A1 | 8/2001 | Haga et al. | |
| 2001/0021469 A1 | 9/2001 | Kaneko et al. | |

FOREIGN PATENT DOCUMENTS

| | | | |
|---|---|---|---|
| EP | 0 278 749 A1 | 11/1990 | ............ B01J/21/14 |
| EP | 0278749 | 11/1990 | ............ B01J/21/14 |
| EP | 1061011 A1 | 12/2000 | ............ B01J/23/60 |
| EP | 1 063 011 A1 | 12/2000 | ............ B01J/23/60 |
| EP | 1063011 A1 | 12/2000 | ............ B01J/23/60 |
| GB | 1366367 | 9/1974 | ............ B01J/11/06 |
| JP | 60082137 | 5/1985 | ............ B01J/23/60 |
| JP | 60227834 | 11/1985 | ................... 23/46 |
| WO | WO 00/06295 | 2/2000 | |

OTHER PUBLICATIONS

ZR Ismagilov et al., "Development and Study of Metal Foam Heat–Exchanging Tubular Reactor: Catalytic Combustion of Methane Combined With Methane Steam Reforming", p. 2759–2764, 2000.

MV Twigg et al., "Metal and Coated–Metal Catalysts", p. 59–90, no date available.

AM Adris et al., "On the Reported Attempts to Radically Improve The Performance of the Steam Methane Reforming Reactor", p. 177–186, 1996.

(Continued)

Primary Examiner—Stanley S. Silverman
Assistant Examiner—Maribel Medina
(74) Attorney, Agent, or Firm—Stephen R. May; Frank Rosenberg

(57) ABSTRACT

The present invention provides catalysts, reactors, and methods of steam reforming alcohols over a catalyst. Surprisingly superior results and properties obtained in methods and catalysts of the present invention are also described.

53 Claims, 7 Drawing Sheets

OTHER PUBLICATIONS

N Iwasa et al., "Steam Reforming of Methanol Over Pd/ZnO: Effect of the Formation of PdZn Alloys Upon the Reaction", p. 145–157, 1995.

N Iwasa et al., "Highly Selective Supported Pd Catalysts for Steam Reforming of Methanol", p. 211–216, 1993.

N Iwasa et al., "Steam Reforming of Methanol Over Pd–Zn Catalysts", p. 355–360, 2000.

PCT International Search Report.

JP 60082137 Abstract, 1985.

"Partial Oxidation of methanol over supported palladium catalysts," Cubeiro, Applied Catalysts A: General, 168, 307–322 (1998).

Fernandez–Garcia, "Structural Characteristics and Redox Behavior of CeO2–ZrO2/Al2O3 Supports," J. Catal., 385 (2000).

Cubeiro et al., "Selective Production of Hydrogen by Partial Oxidation of Methanol over ZnO–Supported Palladium Catalysts," J. Catal., 179, 150, 157–158 (1998).

Taiwanese Patent Application No. 374,825, "A Pre–combustion Catalytic Converter and a Process for Producing Such a Converter," in English, filed Jun. 30, 1999. This application appears to be related to U.S. Pat. No. 6,458,279 (filed Jul. 22, 1998).

Taiwanese Patent Application No. 159,750, "Catalytically Active Materials," in English. Appears to be equivalent to U.S. Patent No. 4,912,077 (1990).

PCT Search Report, mailed Oct. 4, 2002, PCT/US 02/04527.

Cubeiro et al., "Partial oxidation of methanol over supported Palladium catalysts," Appl. Catal., A: General 168, 307–322 (1998).

Iwasa et al., "Steam reforming of methanol over Pd/ZnO: Effect of the formation of PdZn alloys upon the reaction," Appl. Catal., A: General 125, 145–157 (1995).

* cited by examiner

US 6,936,237 B2

REFORMING CATALYSTS AND METHODS OF ALCOHOL STEAM REFORMING

RELATED APPLICATIONS

This application is a continuation-in-part of U.S. patent application Ser. No. 09/640,903, now U.S. Pat. No. 6,680, 044 (filed Aug. 16, 2000), and Ser. No. 09/375,614, now U.S. Pat. No. 6,488,838 (filed Aug. 17, 1999) all of which are incorporated herein as if reproduced in full below.

This invention was made with Government support under contract DE-AC0676RLO1831. The Government has certain rights in this invention.

FIELD OF THE INVENTION

The invention relates to catalysts and methods of steam reforming alcohols.

BACKGROUND OF THE INVENTION

The use of hydrogen gas ($H_2$) fueled fuel cells such as polymer electrolyte membrane fuel cells (PEMFCs) offer the potential of reducing carbon dioxide ($CO_2$) and eliminating nitric oxide emissions from vehicles. However, current technology does not offer economically attractive options for storage of enough hydrogen gas to deliver the driving range to which motorists are accustomed. Instead of carrying a tank of hydrogen gas, vehicles could carry a tank of liquid fuel such as an alcohol. The alcohol, typically methanol, would pass through a fuel processor that converts the methanol to hydrogen gas that immediately passes to the fuel cell. In this fashion, hydrogen-powered vehicles need not carry any hydrogen tanks.

The process for converting methanol to hydrogen is known as "steam reforming" and is described by the following (unbalanced) chemical equation:

$$CH_3OH + H_2O = CO + CO_2 + H_2$$

To operate efficiently, the steam reforming reaction must be run in the presence of a catalyst. It has been reported by Isawa et al. that Pd/ZnO is a highly selective catalyst for steam reforming of methanol. See Catal. Lett. 19, 211–216 (1993).

For the purpose of developing an efficient fuel processor, weight and size of the energy device are major considerations. In order to reduce overall size of the on-board power system, insulating material should be minimized. This requires that steam reformer to be operated at relatively low temperature.

SUMMARY OF THE INVENTION

The present invention provides catalysts of at least 3 types: (1) palladium on zinc oxide (Pd/ZnO) on a large pore support (Pd/ZnO/support); (2) palladium-ruthenium or palladium-zinc alloy on alumina or zirconia (Pd—Ru or Pd—Zn/$Al_2O_3$ or $ZrO_2$); and (3) a catalyst comprising copper, zinc, palladium or ruthenium on a cerium promoted alumina or zirconia support.

The invention also provides methods of alcohol steam reforming, reactors, and fuel processing systems that use these catalysts.

In one aspect, the invention provides a method of methanol steam reforming in which methanol and water vapor contact a catalyst; wherein the catalyst contains a palladium on zinc oxide catalyst and where at least 20% of the catalyst's pore volume is composed of pores in the size range of 0.1 to 300 microns. Neither powders nor pellets possess this type of porosity. Preferably, this reaction forms hydrogen from the reaction of said methanol and water vapor at a rate of at least 1.5 mole methanol per gram catalyst per hour (1.5 mole methanol/(g catalyst)(hr)).

In another aspect, the invention provides a fuel processing system comprising a fuel tank connected to a reactor and a reactor connected (either directly or indirectly) to a fuel cell. The reactor contains a palladium on zinc oxide catalyst where at least 20% of the catalyst's pore volume is composed of pores in the size range of 0.1 to 300 microns. The fuel cell is connected to the reactor such that hydrogen gas generated in the reactor can flow into the fuel cell either (1) directly or (2) indirectly with the use of down stream processing to either produce additional hydrogen in a water gas shift reactor and/or a secondary clean up process to reduce carbon monoxide levels or purify the hydrogen prior to entering the fuel cell.

In another aspect, the invention provides a method of alcohol steam reforming in which methanol and water contact a catalyst; where the catalyst comprises palladium or ruthenium on cerium-promoted zirconia or alumina. Hydrogen is formed from the reaction of the methanol and water vapor over the catalyst.

Various embodiments of the invention can provide numerous advantages including one or more of the following: high conversions at relatively short contact times, selectivity control, and low temperature operation.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF PREFERRED EMBODIMENTS

Figure 1:
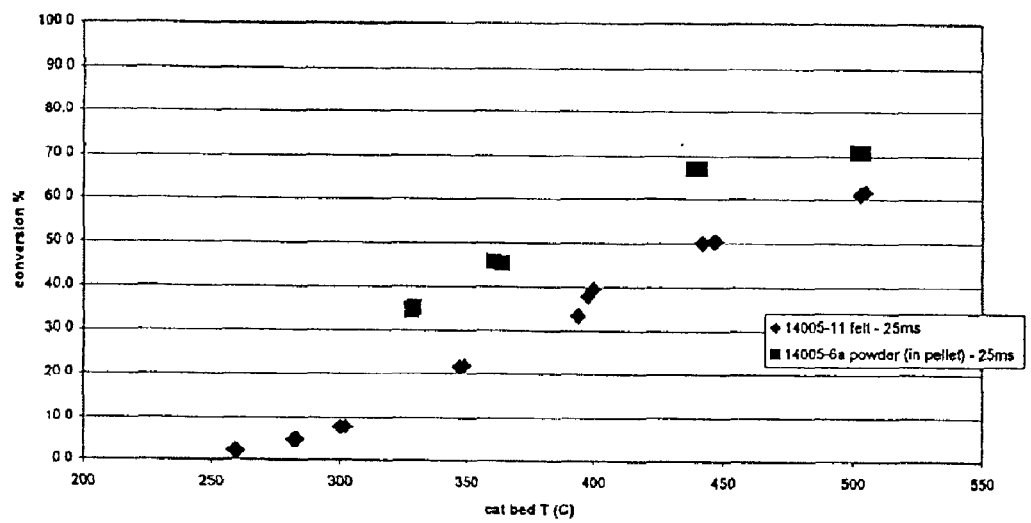
FIG. 1 is a plot of methanol conversion vs. catalyst bed temperature for a powder and felt-supported Pd/ZnO catalyst.

The steam reforming catalyst requires catalytically active surface sites that reduce the kinetic barrier to the alcohol steam reforming reaction. Preferably the active surface sites include palladium (Pd) and/or ruthenium (Ru), Cu, and Pd—Zn alloy that are dispersed over the surface. The catalyst preferably contains up to 30 wt % Pd, more preferably 2 to 10 wt %. The catalyst preferably contains up to 10 wt %, more preferably 0.2% to 5% weight percent Ru. Too little catalytically active metal, preferably Pd and/or Ru, can result in too few catalytic sites, while too much is costly due to lower dispersion.

The surface active sites are dispersed on a (preferably high surface area, BET surface area>10 m$^2$/g) metal oxide support. Preferred metal oxides include ZnO, ZrO$_2$, and Al$_2$O$_3$. The metal oxide, including the presence of catalytically active surface sites, as measured by BET, preferably has a volumetric average pore size of less than 0.1 micrometer ($\mu$m). The metal oxide, including the presence of catalytically active surface sites, as measured by BET, nitrogen physisorption, preferably has a surface area of more than 10 m$^2$/g, more preferably a surface area of 20 to 500 m$^2$/g. The metal oxide can be particles, preferably having diameters less than 4 mm, more preferably less than 1 mm, or, more preferably the metal oxide forms a layer (of agglomerated particles or a continuous film) having a thickness less than 4 mm, more preferably less than 1 mm, and still more preferably a thickness of less than 40 $\mu$m on large pore supports.

The catalyst may take any conventional form such as a powder or pellet. In some preferred configurations, the catalyst includes an underlying large pore support. Examples of preferred large pore supports include commercially available metal foams and, more preferably, metal felts. The large pore support has a porosity of at least 5%, more preferably 30 to 99%, and still more preferably 70 to 98%. Preferably, the support has a volumetric average pore size, as measured by BET, of 0.1 $\mu$m or greater, more preferably between 1 and 500 $\mu$m. Preferred forms of porous supports are foams and felts and these are preferably made of a chemically and thermally stable and conductive material, preferably a metal such as stainless steel or FeCrAly alloy. These porous supports are preferably thin, such as between 0.1 and 1 mm. Foams are continuous structures with continuous walls defining pores throughout the structure. Felts are fibers with interstitial spaces between fibers and includes tangled strands like steel wool. Various supports and support configurations are described in U.S. patent applications Ser. No. 09/640,903 (filed Aug. 16, 2000), U.S. Pat. No. 6,680,044 which is incorporated by reference.

The catalyst with a large pore support preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

In one embodiment, the large-pore substrate has a corrugated shape that could be placed in a reaction chamber (preferably a small channel) of a steam reformer.

One preferred method of making the catalyst is by impregnating a metal oxide with solutions containing the desired metals, typically Pd and/or Ru and Ce (if present) followed by drying, calcining, and reducing. Other methods could be used. For example, it is also anticipated that catalyst with the aforementioned preferred compositions can be prepared by a co-precipitation method using inorganic or organometallic precursors.

When an underlying, large-pore substrate is used, the powder can be slurry coated over the substrate at any stage in the preparative process. For example, a high surface area metal oxide could be slurry coated onto the substrate followed by depositing, drying and activating a metal via the impregnation method. Alternatively, a vapor coat or soluble form of alumina (or other high surface area material) could be applied onto the substrate. Although solution or slurry coating is typically less expensive, vapor coating of the various materials could also be employed.

The present invention also provides methods of steam reforming in which an alcohol is reacted with water vapor at short contact times over the catalysts described above. The contact time is preferably less than 1 s, more preferably 10–500 milliseconds (msec).

The alcohol steam reforming reaction is preferably carried out at 200–500° C., more preferably 240–400° C. The reaction can be run over a broad pressure range from sub-ambient to very high. The alcohol is a $C_1$–$C_{10}$ alcohol, preferably methanol.

Certain aspects of the invention can best be described in terms of properties such as conversion, selectivities, specific activity, and pressure drop. In preferred embodiments, the catalyst, when tested at short contact times in the apparatus schematically illustrated in FIG. 5, or equivalent apparatus, shows good alcohol conversions, selectivities, specific activity and low pressure drop.

Alcohol conversion is preferably at least 50%, more preferably at least 80% and still more preferably at least 90%. Hydrogen selectivity, defined as moles H atoms in $H_2$ in the product gas divided by moles H in all product gases, is preferably at least 50%, more preferably at least 60%, still more preferably at least 85%.

Preferred embodiments of the inventive catalysts and methods may also be described in terms of their exceptionally high specific activity. Preferably, the catalyst and/or method has a specific activity of greater than 1.5 mol methanol converted/(g catalyst)(hr) when tested at 400 C, 25 msec contact time, 1.8 steam-to-carbon ratio; and the catalyst exhibiting this specific activity preferably has a pressure drop of less than 25 psig.

Figure 4:
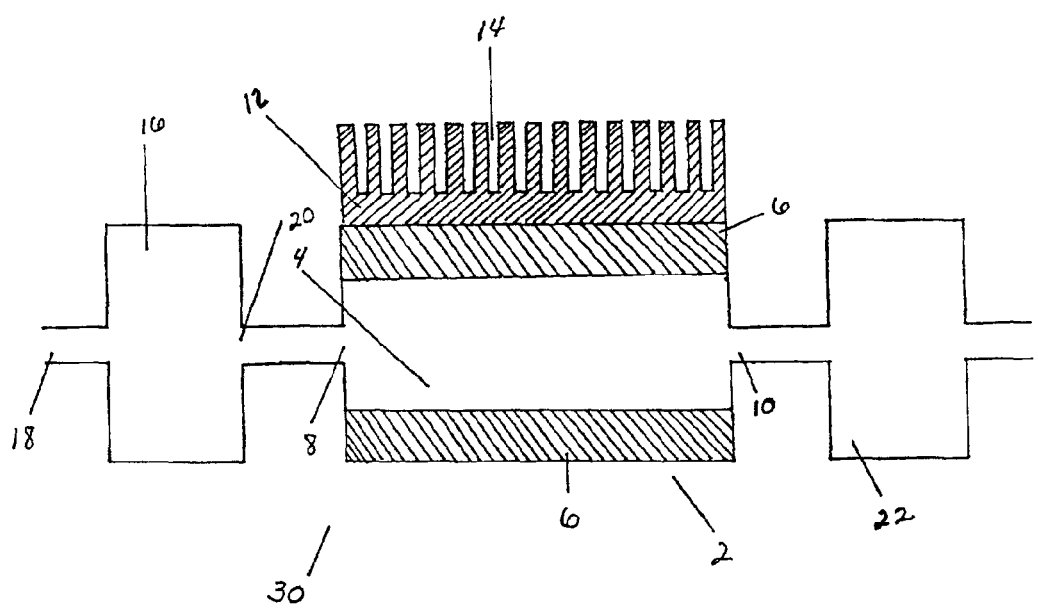
FIG. 4 is a schematic of a simplified fuel cell system that includes a cross-sectional view of a water gas shift reactor that includes a microchannel heat exchanger.

One embodiment of a reactor 2 is shown in cross-section in FIG. 4. The reaction chamber 4 contains catalyst 6 and has an inlet 8 and outlet 10. In FIG. 4, the catalyst is shown on the top and bottom of the reaction chamber with an open channel from the reactor inlet to the outlet—this configuration is called "flow-by." Other configurations, such as "flow-through" where flow is directed through a porous catalyst, are, of course, possible. To improve heat transfer, a microchannel heat exchanger 12 can be placed in contact with the reaction chamber. The microchannel heat exchanger 12 has channels 14 for passage of a heat exchange fluid. These channels 14 have at least one dimension that is less than 1 mm. The distance from the channels 14 to catalyst 6 is preferably minimized in order to reduce the heat transport distance. Microchannel heat exchangers can be made by using known techniques which include such methods as electrodischarge machining (EDM), wire EDM, conventional machining, and the like. An example of example fabrication methods is described in Tonkovich et al., 1997, Proceedings of the 2<sup>nd</sup> International Conference on Microreaction Technology, p. 45–53.

The preferred reaction chamber for the steam reforming reaction may be of any length or height. The preferred reaction chamber width is less than 2 mm. More preferably the reaction chamber width is less than 1 mm. The reaction chamber is preferably in thermal contact with a heat exchange chamber. The heat exchange chamber in thermal contact with the reaction chamber may also be of any length or height. Preferably the length and height of the heat exchange chamber is close to the dimensions of the reaction chamber. Most preferably the heat exchange chamber is adjacent to the reaction chamber in an interleaved chamber orientation (width is the direction in which the interleaved reaction chambers and heat exchangers stack). The width of the heat exchanger chamber is preferably less than 2 mm. More preferably the width of the heat exchange chamber is less than 1 mm. The direction of flow in the heat exchange chamber may be either co-current, counter-current, or cross-flow. This approach will enable excellent heat transfer performance.

The alcohol reforming reactor may also be configured by placing the reaction chamber adjacent to a heat exchanger chamber that is comprised of an array of microchannels rather than a single microchannel. In this configuration the width of the reaction chamber may exceed 2 mm, but at least one dimension of a single microchannel in the array must be less than 2 mm. Preferably this dimension is less than 1 mm. The allowable width of the reaction chamber is a strong function of the effective thermal conductivity of the catalyst insert. The higher the effective thermal conductivity, the wider the insert to enable rapid heat removal. For effective thermal conductivites on the order of 2 W/m/K, it is anticipated that the maximum reaction chamber width must remain less than 2 mm and preferably 1 mm. The advantage of this design approach is easier manifolding, fluid connections, and catalyst loading; but this approach may result in a reduction in heat transfer performance. In some system configurations and embodiments the simpler manifolding may result in a lower system cost that offsets the reduction in heat transfer performance.

In preferred embodiments, the reaction chamber 4 is connected to fuel tank 16 such that alcohol from the tank can flow into the reaction chamber. Although a fuel tank is shown in the Figure, it should be recognized that any alcohol fuel source, such as a pipeline could be used. The liquid fuel stream may flow through a separate vaporizer or be vaporized within a section of the steam-reforming reactor. In some preferred embodiments the alcohol is vaporized in a microchannel vaporizer and/or preheated in a microchannel preheater. The product gases (including $H_2$) then may either flow into fuel cell 22 where the $H_2$ is combined with $O_2$ to generate electricity, or the product of the methanol reforming reactor may flow into a water gas shift reactor to convert some of the carbon monoxide into carbon dioxide and additional hydrogen. This stream may flow directly into a fuel cell 22, or may flow into a secondary clean up process to further purify hydrogen or reduce carbon monoxide to a level that can be accommodated in a fuel cell. The secondary clean-up process may include a preferential oxidation reactor, membrane separation of either hydrogen or carbon monoxide, a sorption based separation system for either hydrogen or carbon monoxide, and the like. These elements form a highly simplified fuel processing system 30. In practice, fuel processing systems will be significantly more complex. Typically, heat from a combustor will be used to generate heat for other processes such as generating steam (not shown) that can be utilized for steam reformer and/or water gas shift reactor. Various fuel cells are well-known and commercially available and need not be described here. Instead of fuel cell 22, the hydrogen-containing gas could go to: a storage tank, a refueling station, a hydrocracker, hydrotreater, or to additional hydrogen purifiers.

EXAMPLES

The following examples are generalized descriptions based on typical conditions used to make numerous samples. Certain temperature ranges, etc. set forth preferred ranges for conducting various steps.

Example 1

Synthesis of Ru—$Al_2O_3$ Catalyst (Comparative Example)

The incipient wetness technique was employed to deposit Ru metal onto the alumina support. Initially, an alumina support was treated by oxidatively calcining gamma alumina at a temperature of about 350 to 550° C. to remove water from the micropores of the support. Meanwhile, aqueous Ru solution was prepared by diluting Ru(III)nitrosyl (obtained from Aldrich Chemical Co. as an aqueous solution of dilute nitric acid containing 1.5 wt % Ru) with DI water. Alternatively, non-aqueous Ru solution could be used by dissolving an organic Ru compound in an organic solvent such as acetone. The target Ru concentration in the fired catalyst was 1–3 wt %. For single step impregnation, the amount of Ru solution utilized was an amount that is at least equivalent to the pore volume of the alumina utilized. The impregnated catalyst was dried at a temperature of 100° C. for a period of 12 hours in air so as to spread the metal over the entire support. The dried catalyst was calcined by heating slowly in air at rate of 2° C./min, to a temperature in the range of 300 to 500° C., that is sufficient to decompose the metal salts. The aforesaid drying and calcinations steps can be done separately or can be combined.

The foregoing impregnation steps were repeated with additional impregnation solutions in order to obtain the desired metal loading. After the last impregnation sequence and calcination, the Ru impregnated alumina, Ru—$Al_2O_3$, was then subjected to an activation treatment, preferably reduction in the presence of hydrogen at 300–400° C.

Example 2

Synthesis of Pd—Ru/CeO—$ZrO_2$

Cerium oxide was impregnated on $ZrO_2$ using $Ce(NO_3)_3$ hexahydrate from Aldrich. The desired concentration of Ce was from 1 to 3 wt %. After impregnation, the Ce promoted $ZrO_2$ was dried and calcined according to the procedure described in above examples. Pd and Ru were co-impregnated on CeO—$ZrO_2$. $Pd(NO_3)_2$ solution containing 20 wt % Pd (Engelhard) was mixed with 1.5 wt % Ru(III)nitrosyl (Aldrich) at a predetermined ratio. The amount of Pd—Ru solution utilized was an amount at least equivalent to the pore volume of the CeO—$ZrO_2$ utilized. Depending on desired metal loading, sequential impregnation (multi-step impregnation) may be used by repeatedly adding Pd—Ru solution. Between each impregnation step, catalyst was dried and calcined. After the last impregnation and calcinations sequence, the metal impregnated catalyst support was subjected to an activation treatment, preferably reduction at 300–500° C.

Example 3

Pd/ZnO and Pd—ZnO on $Al_2O_3$

Pd/ZnO catalyst is prepared by impregnating $Pd(NO_3)_2$ solution (Engelhard, 20 wt % Pd) on ZnO oxide (Aldrich).

Typical Pd loading varied from 5 to 20 wt %. The impregnation procedure was similar to that used in the above examples. After impregnation, the catalyst was calcined at 350–550° C.

Pd—ZnO can be coated on a high surface area support such as $Al_2O_3$. Coating Pd—Zn on $Al_2O_3$ enhances available surface area so as to increase the number of active sites. First, a thin layer of ZnO is formed on $Al_2O_3$ surface. This can be done by soaking 2.0 gram of $Al_2O_3$ in 0.5 M $Zn(NO_3)_2$ solution, followed by drying at 100° C. and calcining at 350° C. After a thin layer of ZnO is formed on the surface, Pd is introduced by impregnating ZnO—$Al_2O_3$ with $Pd(NO_3)_2$. The amount of $Pd(NO_3)_2$ used depends on the desired loading of Pd which varies from 5 to 20 wt %. The catalyst was subjected to final calcinations in air at 350–650° C. Prior to steam reforming reaction, the catalyst should be reduced by hydrogen at 125–500° C. Different from above sequential impregnation, Pd nitrate and Zn nitrate can be co-impregnated on alumina. A Pd and Zn nitrate solution is prepared at a pre-determined ratio, the solution that contains both Pd and Zn can be impregnated on $Al_2O_3$.

Example 4

Engineered Steam Reforming Catalyst

Catalyst was coated on FeCrAlY felt (obtained from Technetics, Deland, Fla.) using a wash-coating technique. Catalyst in the powder form was prepared using methods described in examples 1–3. Catalyst coating slurry was prepared by mixing powder catalyst with de-ionized water in the ratio of 1:6. The mixture was ball-milled for 24 hours to obtain coating slurry containing catalyst particles less than 1 micron. Before wash coating, metal felt is pretreated by a rapid heating to 900° C. in air for 2 hours. The heat-treated felt was wash-coated by dipping the felt into catalyst slurry. The wash coating process may be repeated to obtain desired weight gain. Between each coating, the felt coated with catalyst was dried in an oven at 100° C. for 1 hour. The coating procedure is repeated to achieve desired coating thickness. After the final coating step, the catalyst was dried overnight in an oven at 100° C. and calcined by heating slowly in air at rate of 2° C./min to a temperature in the range of 300 to 500° C. The amount of catalyst coated was measured to be 0.1 gram catalyst per square inch (6.5 $cm^2$) of felt. After coating, the felt coated with catalyst was calcined at between 300–500° C. for 3 hours in air. Prior to steam reforming testing, the engineered catalyst felt was subjected to an activation treatment, preferably reduction at 300–400° C.

The above procedure can be applied to metal foams made of stainless steel, copper, alloys, etc.

Experimental Steam Reforming Testing Procedure

Figure 5:
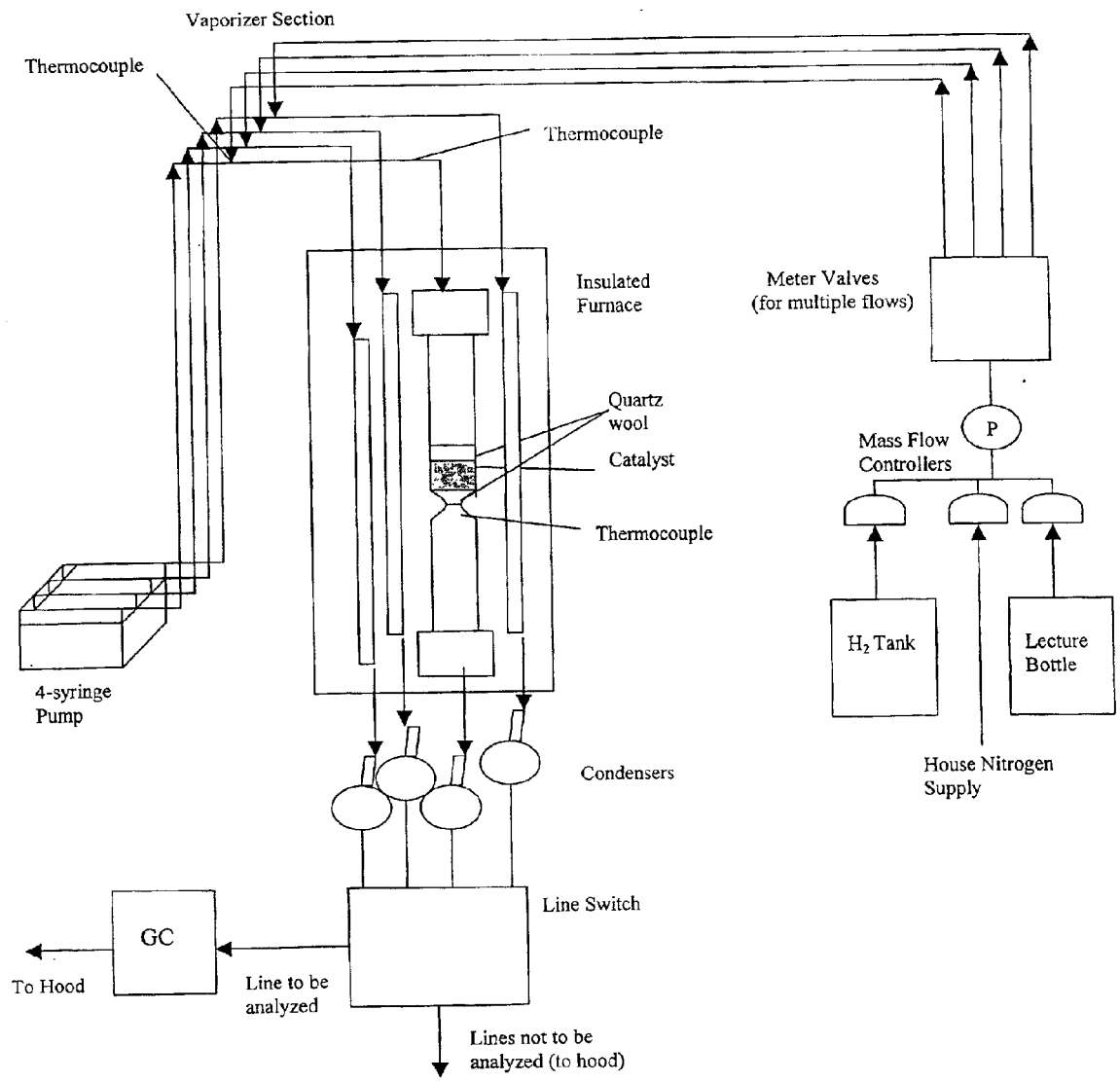
FIG. 5 is a schematic of catalyst testing apparatus.

Steam reforming of methanol was carried out in a conventional fixed-bed down flow reactor. The reactor used for powder testing has an inside diameter of 5 mm. Typical catalyst loading was 0.06 gram of 70–100 mesh particles. The dimension of the channel is 2"×0.37"×0.03" (5 cm×0.94 cm×0.13 cm; length×height×width). The steam reforming reaction was conducted between 220–475° C. and atmospheric pressure. Prior to the reaction, catalysts were reduced in a 10% hydrogen stream in the temperature range from 125 to 350° C. at atmospheric pressure. A mixture of $N_2/H_2$ was fed during start-up to establish steady state flow and to heat the reactor to a desired temperature. When catalyst bed temperature reached the target, premixed methanol and water with $H_2O/CH_3OH$ molar ratio of 1.78 were vaporized in a preheater and fed into the reactor. $H_2$ flow was discontinued while $N_2$ flow continued to stabilize feed flow. Total feed flow rate was set to give desired contact time. When desired the contact time was fixed at 100 msec, total flow rate was set at 363 ml/min. A schematic diagram of the testing apparatus is shown in FIG. 5. The reaction products were analyzed by on-line GC. Methanol conversion was calculated based on feed and product flow rates and carbon balance. The selectivity was also evaluated based on carbon balance: CO selectivity=$[CO]/([CO]+[CO_2]+[CH_4])$.

When testing engineered catalyst, two felts (2"×0.35"× 0.01") were placed in the single channel device (2"×0.37"× 0.03") with a close contact with wall and a 0.01" gap in between. The single channel device is a pellet made of stainless steel with diameter of 0.5 inch (1.3 cm).

Figure 2:
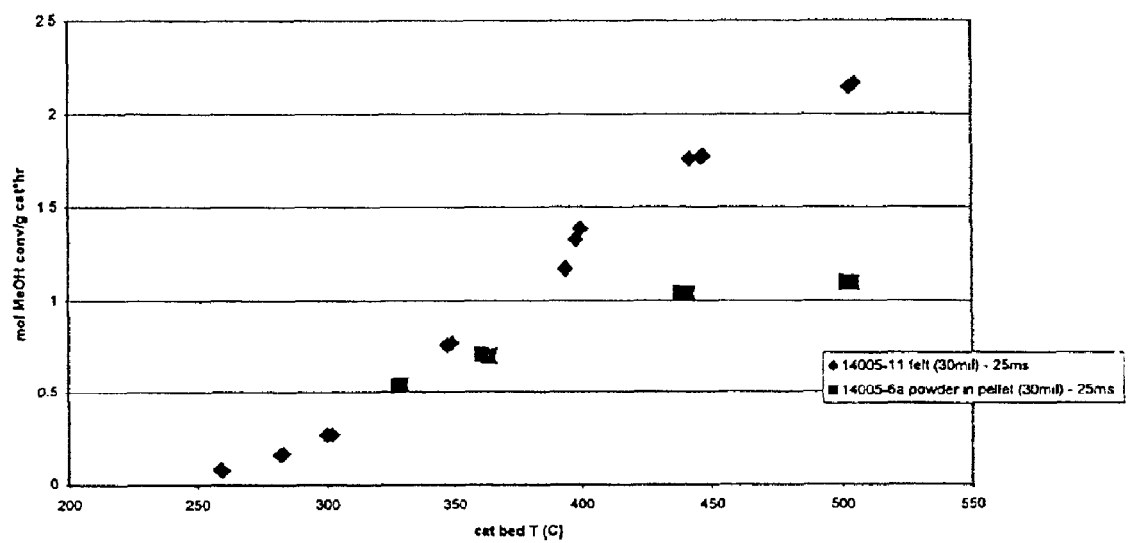
FIG. 2 is a plot of specific activity vs. temperature for a powder and felt-supported Pd/ZnO catalyst.
Figure 3:
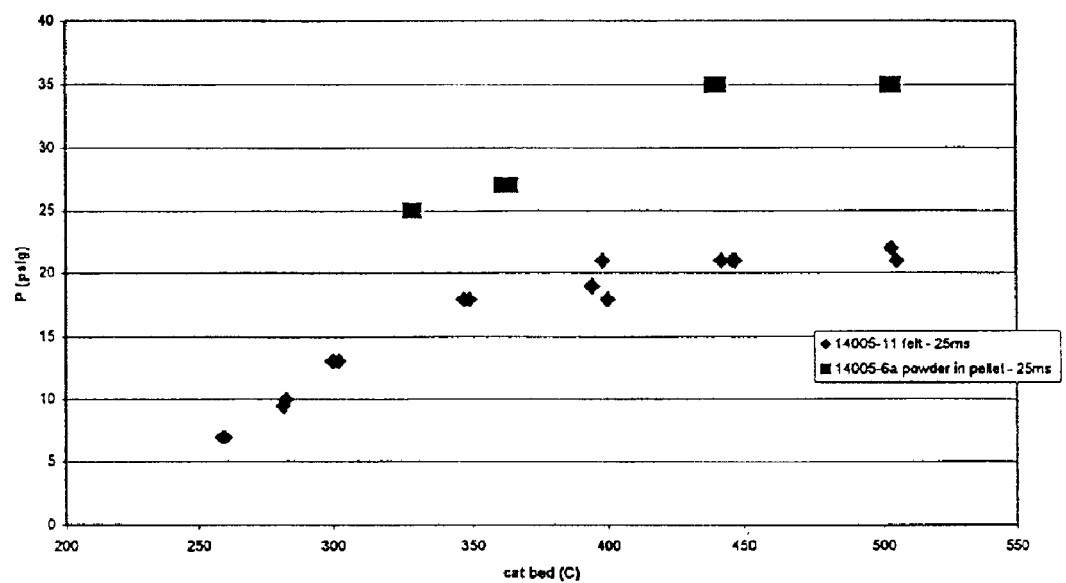
FIG. 3 is a plot of pressure drop for the powder and felt-supported Pd/ZnO catalysts.

Steam reforming experiments were conducted to evaluate the effectiveness of both powdered and engineered catalysts described in Examples 4 and 5. All catalysts were evaluated in a single channel device (2"×0.37"×0.03"). Powdered catalyst with a particle size in the range of 70–100 mesh was packed inside the channel with a length of 2 inches. Two engineered catalysts (2"×0.35"×0.01")were inserted within the single channel device and in contact with channel with a gap of 0.0254 cm in between. The single channel device was placed in a tube furnace. Reactants were preheated in the top zone of the furnace, and were introduced into the single channel device in a down-flow mode. Steam reforming of methanol was conducted at a fixed contact time, a steam-to-carbon ratio of 1.8/1, and a temperature maintained at 250 to 500° C. (chamber temperature was continuously monitored by a thermocouple). Effluent flowrate was measured by a bubble flowmeter, and product was analyzed using gas chromatography. Steam reforming activities of powdered Pd/ZnO catalyst and engineered catalyst are compared. As shown in the attached FIGS. 1–3, under the same conditions, powdered catalyst showed relatively higher methanol conversion (FIG. 1). However, when specific activity, in terms of mol MeOH converted per gram of catalyst (Pd/ZnO) per hour, was compared (FIG. 2), engineered catalyst is much more active. At lower temperatures (250–350° C.), the advantage of using engineered catalyst is not significant, which is probably due to less mass transfer limitations and both engineered and powdered catalysts exhibit similar effectiveness factors. However, at higher temperatures (>350 C), where mass transfer limitations are likely to predominate, engineered catalyst shows higher activity and the enhancement increases with temperature. This is probably due to less mass transfer limitations and improved catalyst effectiveness factor with engineered catalyst. Another plausible reason for the activity enhancement is likely due to the improved heat transfer with engineered substrate (FeCrAlY felt). It is envisioned that further enhancement in catalyst effectiveness factors, as a result of improvement in thermal conductivity, can be achieved using the felts consisted of metals with higher thermal conductivities such as Al, Cu, brass. In addition, an advantage of using engineered catalyst is also evidenced by lower pressure drop across the catalyst bed as shown in FIG. 3, where maximum pressure drop for engineered catalyst is 20 psig while powder catalyst showed 35 psig pressure drop. Lower pressure drop is always desired.

Figure 6:
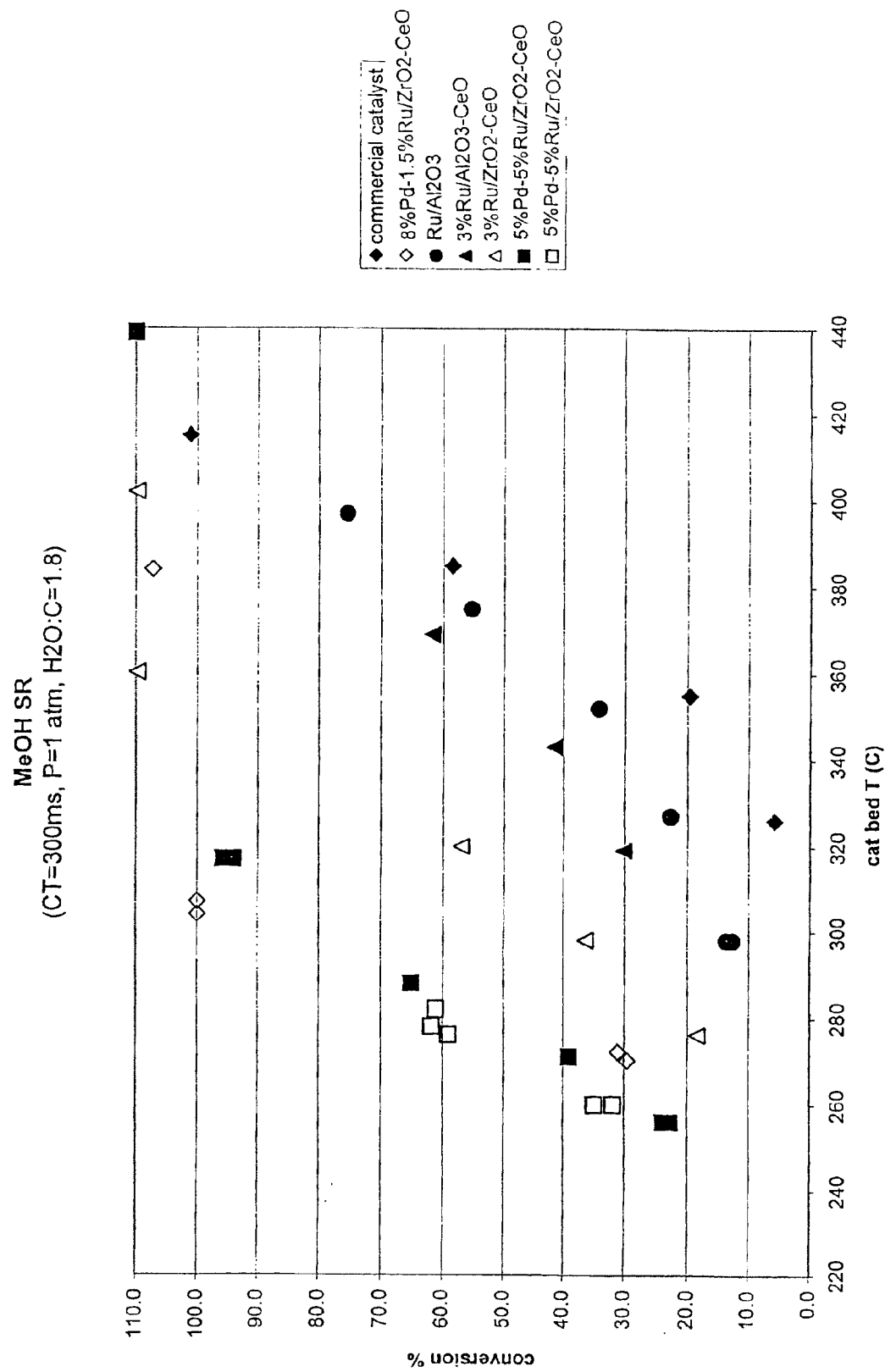
FIG. 6 is a plot of methanol conversion vs. catalyst bed temperature for a variety of powder catalysts.
Figure 7:
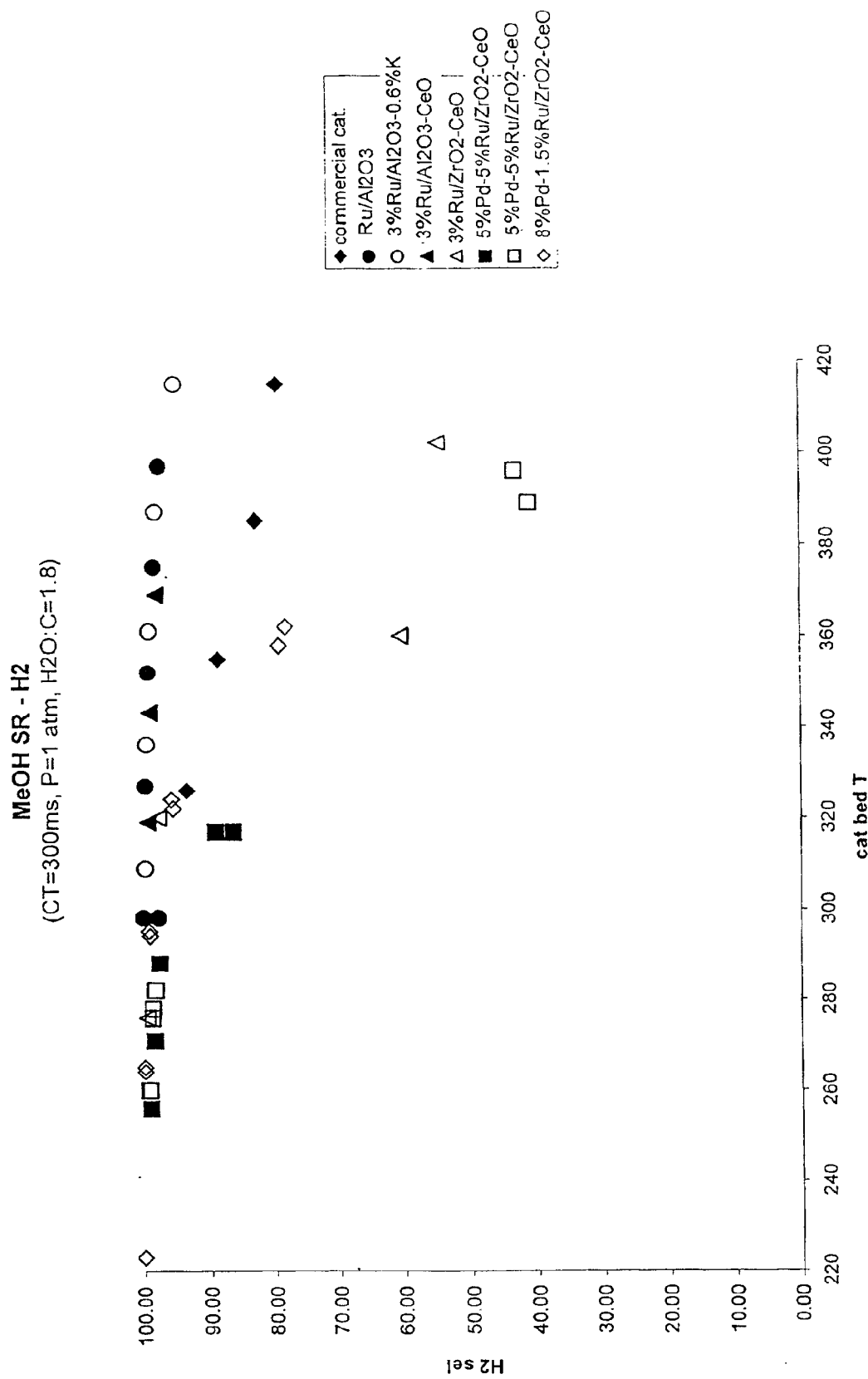
FIG. 7 is a plot of hydrogen selectivity vs. catalyst bed temperature for a variety of powder catalysts.
Figure 8:
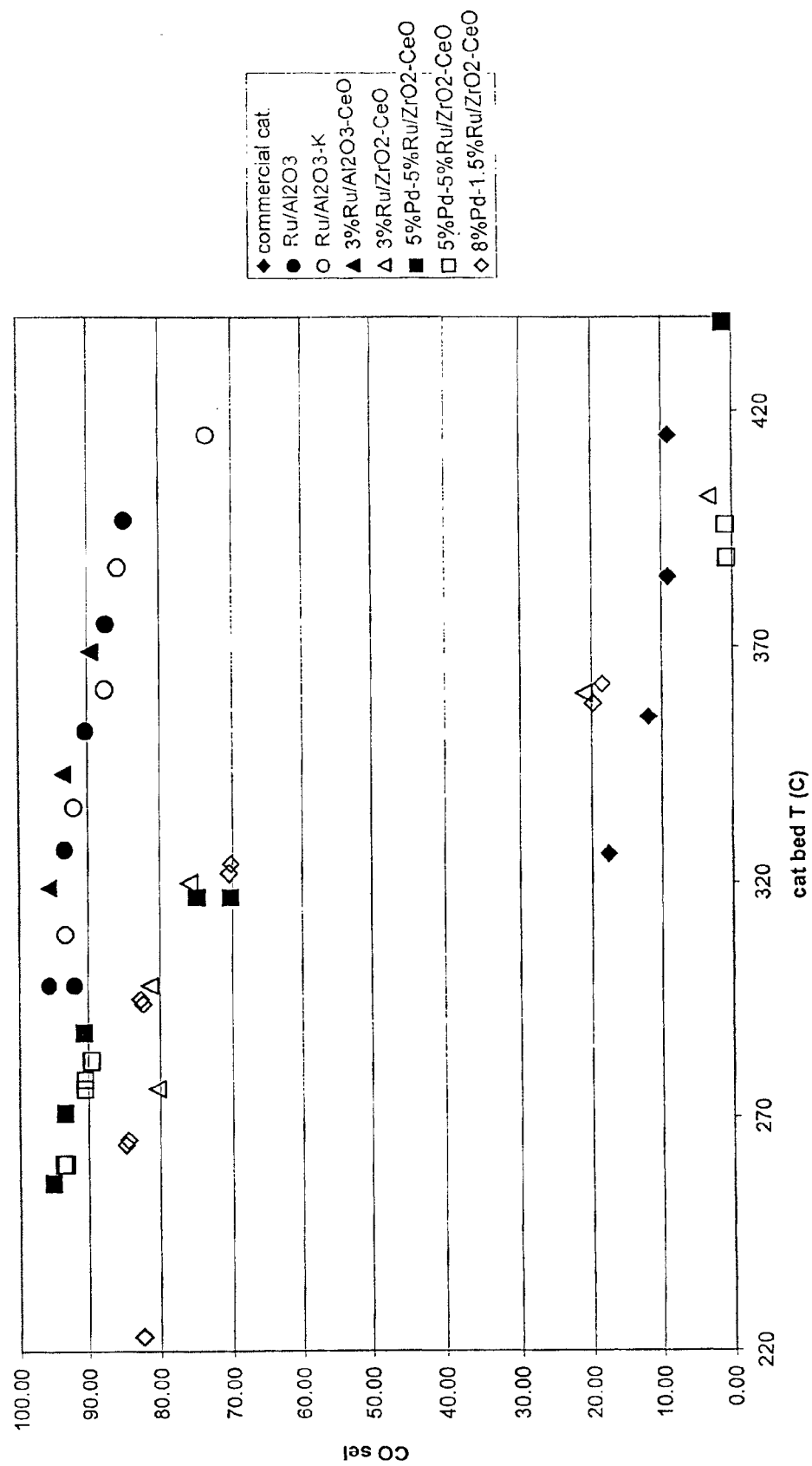
FIG. 8 is a plot of CO selectivity vs. catalyst bed temperature for a variety of powder catalysts.

Comparisons of 5 powder catalysts prepared as described above and a commercial catalyst (Cu/Zn/Al) are shown in FIGS. 6–8. The commercial catalyst and the 3 wt % Ru on alumina (•) exhibited the poorest performance as measured by methanol conversion. As can be seen from FIG. 6, it was surprisingly discovered that cerium-promoted catalysts per-form better than the otherwise-identical catalysts that lacked the cerium promoter. It was also found that for a fixed metal loading, catalysts relatively rich in Pd performed better than catalysts relatively rich in Ru; for example, an 8 wt % Pd-2 wt % Ru/Al$_2$O$_3$ catalyst performed better than a 5 wt % Pd-5 wt % Ru/Al$_2$O$_3$ catalyst. Excellent conversions were also obtained for a Pd/ZnO powder catalyst. Surprisingly, Pd/ZnO on a large pore support was found to exhibit superior specific activity as compared with the powder catalyst, even at lower pressure drops and identical contact times. The performances of Pd/ZnO or other methanol steam reforming catalysts can be further improved by optimizing the mass and heat transfer characteristics of the engineered ("engineered" refers to catalysts having a large pore support) catalysts.

CLOSURE

While preferred embodiments of the present invention have been shown and described, it will be apparent to those skilled in the art that many changes and modifications may be made without departing from the invention in its broader aspects. The appended claims are therefore intended to include all such changes and modifications as fall within the true spirit and scope of the invention.

We claim:

1. A method of methanol steam reforming comprising:
   contacting methanol and water vapor with a catalyst;
   wherein the catalyst comprises a palladium on zinc oxide catalyst
   wherein said catalyst has a pore volume and at least 20% of the catalyst's pore volume is composed of pores in the size range of 0.1 to 300 microns; and
   forming hydrogen from the reaction of said methanol and water vapor at a rate of at least 1.5 mole methanol per gram catalyst per hour (1.5 mole methanol/(g catalyst) (hr)).

2. The method of claim 1 wherein the catalyst comprises 2 to 10 weight percent Pd.

3. The method of claim 1 wherein the ZnO forms a layer having a thickness of less than 40 μm on a large pore support.

4. The method of claim 1 wherein the catalyst comprises a large pore support wherein the support comprises a metal foam or metal felt.

5. The method of claim 1 wherein the catalyst has a pore volume of 30 to 95%.

6. The method of claim 5 wherein at least 50% of the catalyst's pore volume is composed of pores in the size range of 0.1 to 300 microns.

7. The method of claim 1 wherein at least 50% of the catalyst's pore volume is composed of pores in the size range of 0.3 to 200 microns.

8. The method of claim 1 wherein at least 20% of the catalyst's pore volume is composed of pores in the size range of 1 to 100 microns.

9. The method of claim 1 wherein the catalyst comprises a large pore support that has a corrugated shape.

10. The method of claim 1 wherein the contact time is less than 1 sec.

11. The method of claim 10 wherein the step of contacting methanol and water vapor with a catalyst is conducted at a temperature of 200 to 500° C.

12. The method of claim 11 wherein methanol conversion is at least 50%.

13. The method of claim 1 wherein the contact time is in the range of 10 to 500 msec.

14. The method of claim 13 wherein the step of contacting methanol and water vapor with a catalyst is conducted at a temperature of 200 to 500° C.

15. The method of claim 14 wherein the step of contacting methanol and water vapor with a catalyst is conducted at a temperature of greater than 350° C.

16. The method of claim 1 wherein the catalyst is disposed in a reaction chamber in a flow-by configuration.

17. The method of claim 16 wherein the catalyst is disposed in a reaction chamber that has a width less than 2 mm; and further wherein the reaction chamber is in thermal contact with a heat exchange chamber.

18. The method of claim 17 wherein the catalyst comprises a porous support having a thickness of between 0.1 and 1 mm.

19. The method of claim 17 wherein the step of contacting methanol and water vapor with a catalyst is conducted at a temperature of greater than 350° C.

20. The method of claim 16 wherein the step of contacting methanol and water vapor with a catalyst is conducted at a temperature of greater than 350° C; and
   wherein the pressure drop through the reaction chamber is 20 psig or less.

21. The method of claim 16 wherein the catalyst comprises two pieces separated by a gap.

22. The method of claim 21 wherein the reaction chamber that has a width less than 2 mm.

23. The method of claim 1 wherein the catalyst is disposed in a reaction chamber that has a width less than 2 mm; and further wherein the reaction chamber is in thermal contact with a heat exchange chamber.

24. The method of claim 23 wherein the reaction chamber and heat exchange chamber are adjacent and in an interleaved chamber orientation.

25. The method of claim 24 wherein the heat exchange chamber has a width of less than 2 mm.

26. The method of claim 1 wherein the step of contacting methanol and water vapor with a catalyst is conducted at a temperature of greater than 350° C.

27. The method of claim 26 wherein the catalyst is disposed in a reaction chamber in a flow though configuration.

28. A method of alcohol steam reforming comprising:
   contacting methanol and water vapor with a catalyst with a contact time of less than 1s in a reaction chamber having a width less than 2 mm;
   wherein the catalyst comprises palladium or ruthenium on cerium-promoted zirconia or alumina; and
   forming hydrogen from the reaction of said methanol and water vapor;
   wherein the methanol conversion is at least 80% and the H$_2$ selectivity is at least 50%.

29. The method of claim 28 wherein the CO selectivity is below about 80%.

30. The method of claim 29 wherein the method is conducted at a temperature of 200 to 500° C.

31. The method of claim 28 wherein the CO selectivity is below about 20%.

32. The method of claim 31 wherein the method is conducted at a temperature of 240 to 400° C.

33. The method of claim 31 wherein the methanol conversion is at least 90% and the H$_2$ selectivity is at least 85%.

34. The method of claim 28 wherein the methanol conversion is at least 90% and the H$_2$ selectivity is at least 85%.

35. The method of claim 34 wherein the catalyst contains 2 to 10 weight % Pd.

36. The method of claim 35 wherein the catalyst has a pore volume of 5 to 98% and at least 50% of the catalyst's pore volume is composed of pores in the size range of 0.1 to 300 microns.

37. The method of claim 28 wherein the cerium-promoted zirconia or alumina is a layer of less than 1 mm on a large pore support that has a volumetric average pore size of 0.1 $\mu$m or greater.

38. The method of claim 37 wherein the large pore support has a porosity of 30 to 99% and a volumetric average pore size of between 1 and 500 $\mu$m.

39. The method of claim 38 wherein the large pore support has a thickness of between 0.1 and 1 mm and the layer of cerium-promoted zirconia or alumina has a thickness of less than 40 $\mu$m.

40. The method of claim 28 wherein the catalyst has a pore volume and at least 20% of the catalysts pore volume is composed of pores in the size range of 0.1 to 300 microns.

41. A method of alcohol steam reforming comprising:

contacting methanol and water vapor with a catalyst with a contact time of less than 1s;

wherein the catalyst comprises a palladium-ruthenium alloy on zirconia or alumina;

wherein the catalyst comprises a higher weight percent of palladium than of ruthenium; and forming hydrogen from the reaction of said methanol and water vapor;

wherein the methanol conversion is at least 80% and the $H_2$ selectivity is at least 60%.

42. The method of claim 41 wherein the CO selectivity is below about 80%.

43. The method of claim 42 wherein the catalyst is disposed in a reaction chamber having a width less than 2 mm and wherein the method is conducted at a temperature of 200 to 500° C.

44. The method of claim 41 wherein the CO selectivity is below about 20%.

45. The method of claim 44 wherein the catalyst is disposed in a reaction chamber having a width less than 2 mm and wherein the method is conducted at a temperature of 240 to 400° C.

46. The method of claim 45 wherein the methanol conversion is at least 90% and the $H_2$ selectivity is at least 85%.

47. The method of claim 46 wherein the catalyst has a pore volume of 5 to 98% and at least 50% of the catalyst's pore volume is composed of pores in the size range of 0.1 to 300 microns.

48. The method of claim 45 wherein the catalyst contains 2 to 10 weight % Pd and 0.2 to 5 weight % Ru.

49. The method of claim 48 where in the large pore support has a porosity of 30 to 99% and a volumetric average pore size of between 1 and 500 $\mu$m.

50. The method of claim 48 wherein the large pore support has a thickness of between 0.1 and 1 mm and the layer of cerium-promoted zirconia or alumina has a thickness of less than 40 $\mu$m.

51. The method of claim 41 wherein the methanol conversion is at least 90% and the $H_2$ selectivity is at least 85%.

52. The method of claim 41 wherein the cerium-promoted zirconia or alumina is a layer of less than 1 mm on a large pore support that has a volumetric average pore size of 0.1 $\mu$m or greater.

53. The method of claim 41 wherein the catalyst has a pore volume and at least 20% of the catalyst's pore volume is composed of pores in the size range of 0.1 to 300 microns.

* * * * *